United States Patent
Kang

(10) Patent No.: US 9,338,619 B2
(45) Date of Patent: May 10, 2016

(54) USER AUTHENTIFICATION SYSTEM USING CALL IDENTIFICATION INFORMATION AND METHOD THEREOF

(71) Applicant: Seung Han Kang, Seoul (KR)

(72) Inventor: Seung Han Kang, Seoul (KR)

( * ) Notice: Subject to any disclaimer, the term of this patent is extended or adjusted under 35 U.S.C. 154(b) by 181 days.

(21) Appl. No.: 13/946,870

(22) Filed: Jul. 19, 2013

(65) Prior Publication Data

US 2015/0024712 A1    Jan. 22, 2015

(51) Int. Cl.
*H04W 4/16* (2009.01)
*H04M 3/42* (2006.01)
*H04L 29/06* (2006.01)

(52) U.S. Cl.
CPC .............. *H04W 4/16* (2013.01); *H04L 63/0853* (2013.01); *H04L 63/18* (2013.01); *H04M 3/42* (2013.01); *H04M 3/42042* (2013.01)

(58) Field of Classification Search
CPC ....... G07C 5/008; H04L 63/08; G01S 5/0027; G06Q 20/32; G06Q 20/3674; H04W 12/06; H04W 68/12; H04W 76/02; H04M 3/42042; H04M 3/5231; H04M 3/5158; H04M 2207/18; H04M 3/02; H04M 3/42093; H04M 3/58; H04M 15/06; H04M 2203/1016
See application file for complete search history.

(56) References Cited

U.S. PATENT DOCUMENTS

2008/0155674 A1*  6/2008  Hong ................................. 726/7

* cited by examiner

*Primary Examiner* — Nizar Sivji
(74) *Attorney, Agent, or Firm* — Nath, Goldberg & Meyer; Jerald L. Meyer; Stanley N. Protigal

(57) ABSTRACT

A user authentication system using call identification information, includes: a contents service provision server which provides a contents service through a wired/wireless communication network; a first user terminal which accesses the contents service provision server to request a service requiring the approval authentication; an authentication server which makes a call to the first user terminal with a corresponding stored terminal number upon receiving a request for approval authentication from the contents service provision server; and a wired/wireless second user terminal which transmits an approval number during calling with the authentication server, as an audio signal, to the authentication server.

11 Claims, 4 Drawing Sheets

USER AUTHENTIFICATION SYSTEM USING CALL IDENTIFICATION INFORMATION AND METHOD THEREOF

BACKGROUND OF THE INVENTION

1. Field of the Invention

The present invention relates to a user authentication system and method using call identification information, and more particularly, to a user authentication system and method using call identification information, which is capable of providing easy user authentication and high security reliability by performing the user authentication during call connection as an authentication server provides call identification information and a calling service for user authentication when a user uses a contents service requiring approval authentication in wired/wireless environments.

2. Description of the Related Art

As a variety of activities through Internet become possible with recent advance of Internet environments, user authentication become more and more important as prerequisites for such activities.

A user authentication method may generally include a method of using user log-in information, a method of using an encryption program and an encryption key provided by a service company, a method of using a smart card, etc.

The first method of using user log-in information is convenient in use but has a problem of possible hacking and illegal use of user information. That is, since a user computer transmits a pair of ID and password to an authentication server, there is a problem of information leakage by hacking of the user computer or sniffing at a network end.

The second method of using an encryption program and an encryption key provided by a service company is being most frequently used in Internet banking but has a spatial limitation in e-commercial since a provision system has to be installed in a user computer.

The third method of using a smart card provides high security for user authentication with no spatial limitation but has difficulty in spreading apparatuses and devices.

Accordingly, there is a keen need for an easy and convenient authentication method with high security reliability.

In the meantime, modern communication terminals at reception sides can interrupt an undesired call since they can display caller identification information (CID) of a caller side and know a counterpart telephone number before a call connection is established.

However, it is inconvenient in that calling purpose cannot be known before calling reception since the CID can identify only where or who but cannot identify the calling purpose.

RELATED TECHNICAL DOCUMENT

Patent Document

Korean Patent Application Publication No. 10-2002-0002938
[Title: Electronic payment method using phone number]

SUMMARY OF THE INVENTION

The present invention has been made to overcome the above problems and it is an object of the present invention to provide a user authentication system and method which is capable of providing high security reliability and easy user authentication by performing user authentication as an authentication server requests a second user terminal to provide a call for user authentication at a first user terminal and a user inputs an approval number to the second user terminal according to an ARS guidance of the authentication server under a busy calling state.

It is another object of the present invention to provide a user authentication system and method which is capable of providing call identification information to allow a user to recognize that calling purpose is for user authentication before the user receives the calling as an authentication server provides call identification information to a second user terminal at a request of call for user authentication.

It is still another object of the present invention to provide a user authentication system and method which is capable of providing call identification information to allow a user to confirm contents and reliability of a call before the call is made by providing a one-time identifier for user authentication and confirming the provided one-time identifier as well as approval authentication-related information through caller information indication upon receiving a call for approval authentication.

To achieve the above objects, according to an aspect of the invention, there is provided a user authentication system using call identification information, including: a contents service provision server which provides a contents service through a wired/wireless communication network and provides a restricted service through approval authentication; a first user terminal which accesses the contents service provision server to request a service requiring the approval authentication; an authentication server which makes a call to the first user terminal with a corresponding stored terminal number upon receiving a request for approval authentication from the contents service provision server, with approval authentication-related call identification information as caller information indication displayed at the same time of call incoming, provides a voice guidance during call connection, receives an approval number as an audio signal, and delivers a result of the approval to the contents service provision server; and a second user terminal which displays the call identification information on a display screen upon receiving a call from the authentication server, informs the authentication server of contents of the incoming call, and delivers an approval number input under a call connection state, as an audio signal, to the authentication server.

Preferably, the approval authentication-related call identification information is a character, an image or a combination thereof to allow a user to confirm the contents of the incoming call, and the approval number is user-related information stored in the authentication server by the user.

According to another aspect of the invention, there is provided a user authentication system using call identification information, including: an authentication server including: a communication interface which receives approval authentication request information from an external contents server and transmits a result of the approval authentication; a call requester which verifies information of a first user terminal requesting approval authentication and approval authentication-related call identification information from approval authentication request information of the external contents server and makes a call to the first user terminal with a second user terminal number stored in association with the first user terminal, with the approval authentication-related call identification information as caller information indication displayed on the second user terminal at the time of call incoming; and a data comparator which receives an approval number, as an audio signal, from the second user terminal during call connection, compares the received approval number with a stored approval number to determine whether or not the approval authentication is made, and transmits a result of the determination to the external contents server via the communication interface.

According to still another aspect of the invention, there is provided a user authentication method using call identification information, including: an approval authentication requesting step in which a first user terminal requests a contents service provision server to provide a service requiring approval authentication; a call identification information transmitting step in which the contents service provision server requested to provide the service requiring the approval authentication delivers approval authentication-related call identification information to an authentication server and requests the authentication server to provide the approval authentication; a call outgoing step in which the authentication server requested to provide the approval authentication makes a call to the second user terminal with a corresponding terminal number stored in association with the first user terminal, with the received approval authentication-related call identification information as caller information indication displayed on the second user terminal at the time of call incoming; an approval number input step in which the second user terminal displays the approval authentication-related call identification information, informs the authentication server of the call incoming, and transmits an approval number for user authentication input according to a guidance under an incoming call connection state, as an audio signal, to the authentication server; and an approval processing step in which the authentication server compares the approval number received from the second user terminal with a stored approval number and delivers a result of the approval to the contents service provision server.

Preferably, the approval number is information stored in the authentication server by a user and, in the approval number input step, the second user terminal transmits the approval number in a DTMF (Dual-Tone Multi-Frequency) signaling scheme.

According to still another aspect of the invention, there is provided a user authentication method using call identification information, including: a call outgoing step in which an authentication server received an approval authentication request including approval authentication-related call identification information from a contents service provision server for provision of a service requested from a first user terminal makes a call to a second user terminal with a corresponding terminal number stored in association with the first user terminal, with the received approval authentication-related call identification information as caller information indication displayed on the second user terminal at the time of call incoming; an approval number input requesting step in which the authentication server requests the second user terminal to input an approval number for user authentication through a voice when a call is connection as the call made in the call outgoing step is received in the second user terminal; and an approval number comparing step in which the authentication server received the approval number as an audio signal from the second user terminal during the call connection compares the received approval number with a stored approval number and delivers a result of the approval to the contents service provision server.

According to still another aspect of the invention, there is provided a user authentication system using call identification information, including: an authentication server including: a call requester which makes a call for approval authentication to a user terminal having a caller indication function to request approval authentication at an external approval authentication request; and a data comparator which provides a voice guidance requesting a user responding to a call for the approval authentication to input an approval number, receives the approval number input during call connection, as audio tone information, confirms whether or not approval is made, and transmits a result of the confirmation to the external requesting the approval authentication, wherein the call requester performs the approval authentication with single calling and provides two kinds of information sequentially in a single communication scheme by further providing the approval authentication-related call identification information as caller indication information displayed on the user terminal at the same time of call incoming.

According to still another aspect of the invention, there is provided a user authentication system using call identification information, including: an authentication server including: a communication interface which receives approval authentication request information including user information and one-time ID information of a first user terminal and approval authentication-related call identification information from an external contents server communicating with the first user terminal and transmits a result of the approval authentication to the external contents server; a call requester which makes a call to a second user terminal with a second user terminal number stored in association with the user information of the first user terminal based on approval authentication request information received through the communication interface, with the approval authentication-related call identification information and the one-time ID information as caller information indication displayed on the second user terminal at the time of call incoming; and a data comparator which receives an approval number, as an audio signal, from the second user terminal during call connection, compares the received approval number with a stored approval number to determine whether or not the approval authentication is made, and transmits a result of the determination to the external contents server via the communication interface.

Preferably, the one-time ID information is one-time information input or selected by a user of the first user terminal to allow the user to identify that the call made by the call requester is a call related to approval requested by the user from the caller information indication displayed when the call made by the call requester is received in the second user terminal.

Preferably, the one-time ID information is displayed as a text or image selected from contents directly input or presented by the user in the caller information indication.

Preferably, the one-time ID information is modified or coded by one of the first user terminal and the external contents server and then is delivered to the call requester, and the call requester restores the modified or coded one-time ID information.

The present invention has an advantage of achieving a high level of security by transmitting a password using a terminal other than a terminal requesting authentication, as opposed to a conventional system where a computer transmits both of ID and password for user authentication in which a user's input procedure may be monitored by a hacker to allow for leakage of the ID and password.

The present invention has another advantage of prevention of omission or delay of transmission of an approval number since the approval number is transmitted under a busy call state, i.e., a state where an authentication server makes a call to a user terminal for user authentication and a user of the user terminal receives a call from the authentication server.

The present invention has still another advantage of providing high reliability and convenience to a user since the user can recognize that a call for approval authentication requested by the user is legal before receiving the call as both of approval authentication-related information and one-time ID information are provided as caller information indications upon receiving a call in a user terminal.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Figure 1:
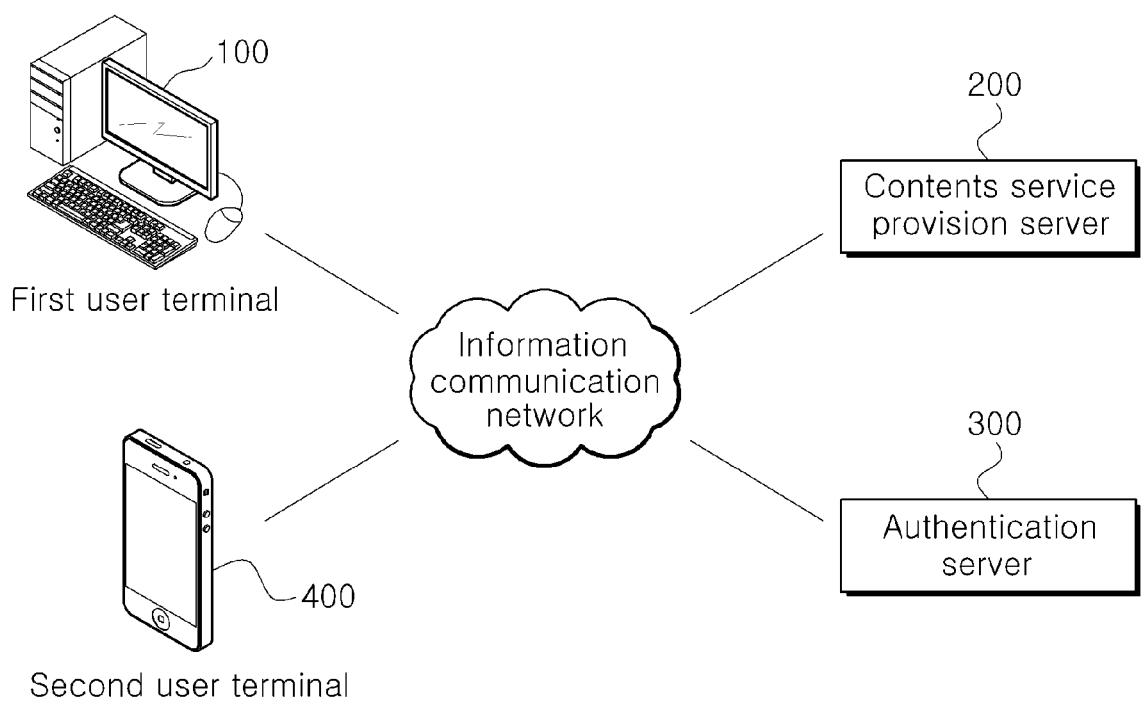
FIG. 1 is a view showing a user authentication system according to one embodiment of the present invention.

Hereinafter, an exemplary embodiment of the present invention will be described in detail with reference to the accompanying drawings. Throughout the description and the drawings, the same elements are denoted by the same reference numerals. In the following detailed description of the present invention, concrete description on related functions or constructions will be omitted if it is deemed that the functions and/or constructions may unnecessarily obscure the gist of the present invention.

FIG. 1 is a view showing a user authentication system according to one embodiment of the present invention. A user authentication system includes a first user terminal 100, a contents service provision server 200, an authentication server 300 and a second user terminal 400.

The first user terminal 100 serves as a client for requesting the contents service provision server 200 to provide a contents service and receiving the contents service therefrom, such as a personal digital assistant (PDA), a notebook computer, a desktop computer, a smartphone TV or the like. For reference, a smartphone TV refers to the next generation versatile and intelligent multimedia device equipped with an operating system (OS), which is capable of two-way service functionality (search, shopping, etc.) via a communication network and support of installation and execution of various applications, as well as TV program viewing.

The contents service provision server 200 is a computing device which provides a contents service to an authenticated client requesting the contents service via a wired/wireless communication network. The contents service provision server 200 can provide various services, such as on-line games, e-commercial goods sales, Internet banking and so on, to an authenticated user.

The authentication server 300 is a computing device which provides a calling for approval number request and call identification information to the second user terminal 400 at a request for authentication from the contents service provision server 200, performs a user authentication based on the approval number received from the second user terminal 400, and provides a result of the authentication to the contents service provision server 200.

The second user terminal 400 refers to a wired/wireless communication-enabling portable terminal equipped with a user input device such as a keypad, a touch pad or the like, including a personal mobile communication terminal, a personal digital terminal, a smartphone, a wireless LAN terminal or the like. The second user terminal 400 displays the call identification information on a display screen upon receiving a call.

Figure 2:
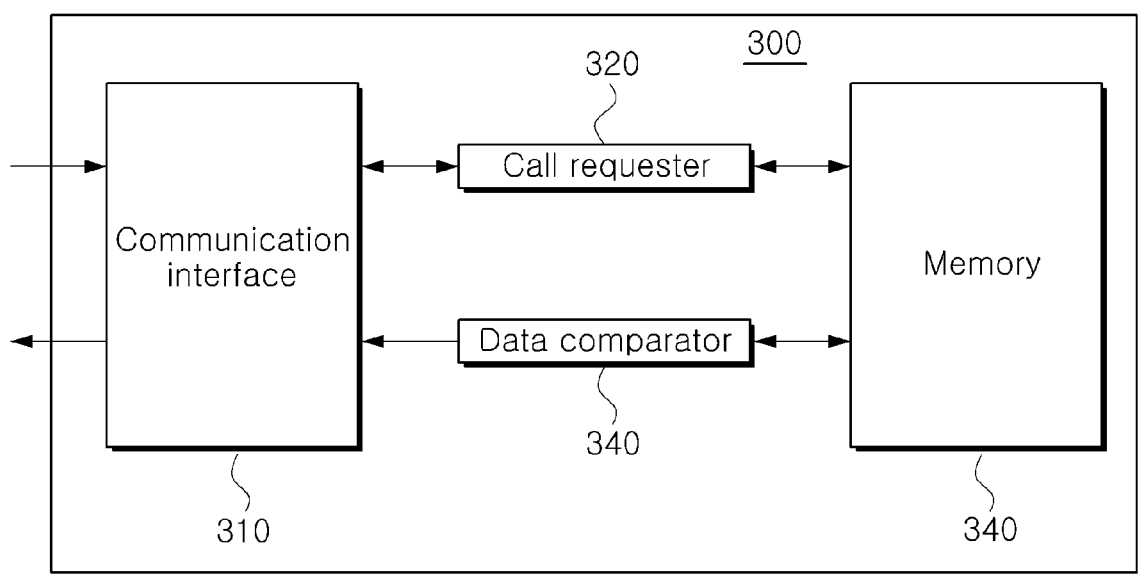
FIG. 2 is a view showing an authentication server according to one embodiment of the present invention.

FIG. 2 is a view showing the authentication server 300 according to one embodiment of the present invention.

As shown in FIG. 2, the authentication server 300 includes a communication interface 310, a call requester 320, a memory 330 and a data comparator 340.

The communication interface 310 serves to exchange data with other devices.

The call requester 320 serves to provide a calling and call identification information to the second user terminal 400 upon receiving a request for user authentication from the contents service provision server 200.

The memory 330 serves to store the call identification information and user information received from the contents service provision server 200. The user information may include a telephone number of the second user terminal 400, user-related information required for authentication, such as an approval number, and the like.

The data comparator 340 serves to compare the approval number received from the second user terminal 400 with an approval number stored in the memory 330 to confirm whether both of the approval numbers match with each other.

Figure 3:
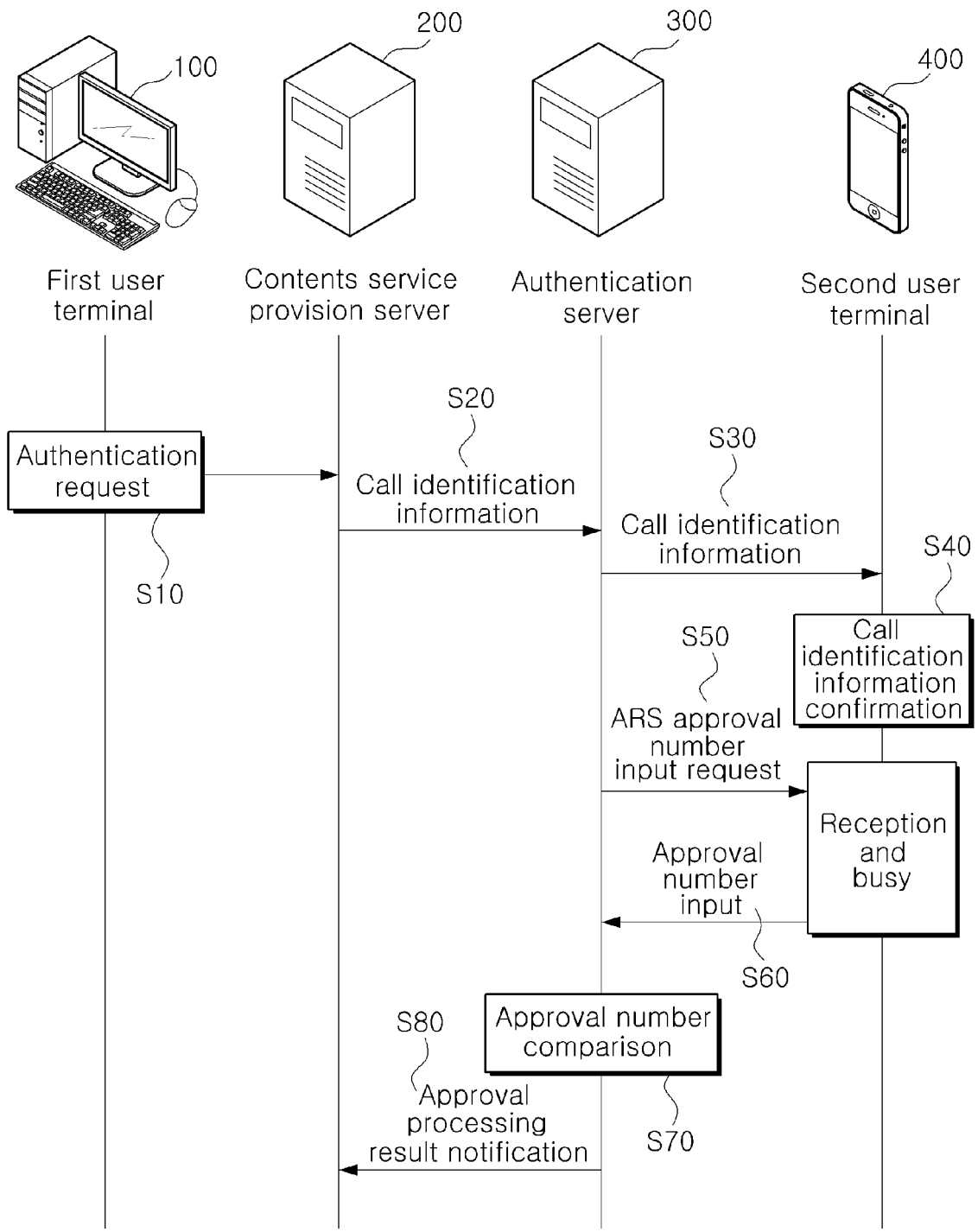
FIG. 3 is a flow diagram of a user authentication method for contents service according to one embodiment of the present invention.

FIG. 3 is a flow diagram of a user authentication method for contents service according to one embodiment of the present invention.

When a user attempts to use the first user terminal 100 to receive a contents service requiring an approval authentication from the contents service provision server 200, the user first uses the first user terminal 100 to access a website of the contents service provision server 200 to request the approval authentication (S10).

Upon receiving the approval authentication for home shopping payment authentication, transfer authentication, paid game access authentication and so on, the contents service provision server 200 requests the authentication server 300 to provide the call identification information and the approval authentication (S20).

The authentication server 300 makes a call to the second user terminal 400 of the user. At this time, the authentication server 300 transmits the call identification information to the second user terminal 400 (S30).

When the second user terminal 400 receives the calling for authentication from the authentication server 300, the call identification information is displayed on the display screen of the second user terminal 400 (S40). The user can watch the displayed call identification information to confirm contents of the calling.

When the user receives the calling to the second user terminal 400 and makes a call connection with the authentication server 300, the authentication server 300 provides an ARS (Automatic Response System) to prompt the user to input the approval number in the second user terminal 400 (S50).

The user transmits the approval number to the authentication server 300 by inputting the approval number using a DTMF (Dual-Tone Multi-Frequency) signaling scheme under a state where the call connection is maintained (S60).

For reference, a DTMF signaling scheme refers to a scheme in which a multi-frequency signal specified for each number button of a user terminal is broadcast, as number (code) information, and applied to an exchanger which then decodes this signal to be converted into digit information.

The authentication server 300 compares the approval number received from the second user terminal 400 with the stored approval number to confirm whether both of the approval numbers match with each other (S70).

If the approval number received from the second user terminal 400 matches with the stored approval number, the contents service provision server 200 is informed of approval authentication success (S80). Otherwise, the contents service provision server 200 is informed of approval authentication failure (S80).

For the approval authentication success, the contents service provision server 200 provides a contents service for the authenticated user.

For the approval authentication failure, the contents service provision server 200 informs the first user terminal 100 of disapproval.

In addition, the contents service provision server 200 displays the approval request screen again and counts the number of approval failures. If the number of approval failures exceeds a predetermined number, the contents service provision server 200 may impose a penalty such as disconnection between the first user terminal 100 and the contents service provision server 20.

Figure 4:
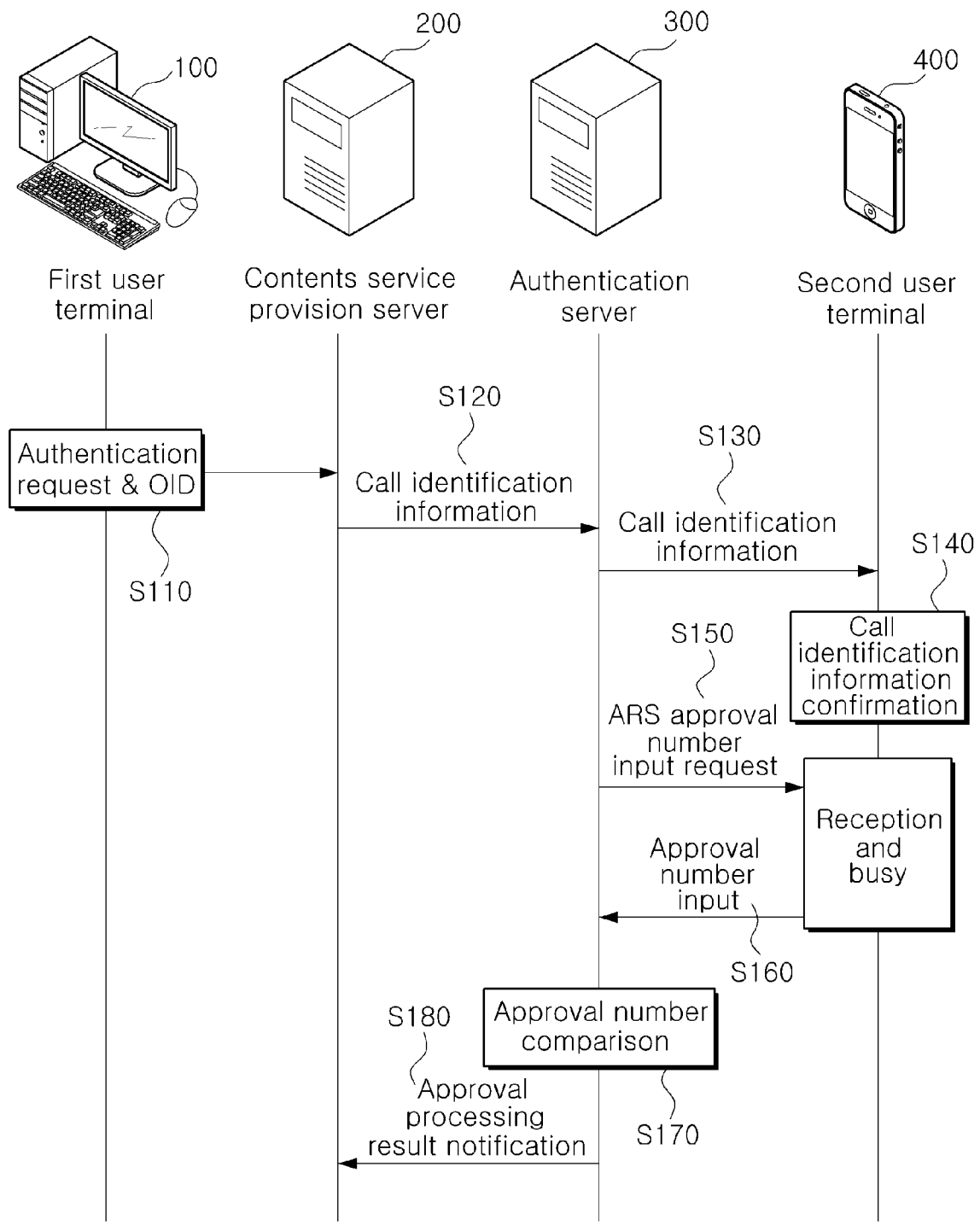
FIG. 4 is a flow diagram of a user authentication method for contents service according to another embodiment of the present invention.

FIG. 4 is a flow diagram of a user authentication method for contents service according to another embodiment of the present invention.

The user authentication method shown in FIG. 4 involves using one-time identification information to prevent an unauthenticated server from making a call to the second user terminal, earlier than an authenticated authentication server, to capture an approval number by hacking, which can result in higher reliability of the authentication server. Specifically, when the user inputs the one-time identification information (OID) while requesting approval authentication, the authentication server makes a call for approval authentication and provides the one-time identification information, as caller information indication, along with approval authentication-related call identification information, to the user, and the user is allowed to verify that the call is related to the approval authentication provided from the authenticated authentication server through the one-time ID and the approval authentication contents displayed by the caller information display function before the user receives the call.

Referring to the flow diagram, when the user uses the first user terminal 100 to access the website of the contents service provision server 200 and make a request for approval authentication, the one-time ID information is provided as well (S110). At this time, the one-time ID information may be an identifier which consists of a simple character (including a symbol) and is manually input by the user, or an image selected or directly drawn by the user, or one selected from a plurality of one-time IDs (characters, images or combinations thereof) presented by the contents service provision server.

Upon receiving the request for approval authentication from the first user terminal 100, the contents service provision server 200 provides the authentication server 300 with information for the approval authentication request (S120). The information for the approval authentication request may include user information and one-time ID information of the first user terminal 100 and approval authentication-related call identification information (information describing what the approval is), After verifying a telephone number of the second user terminal 400 which is stored in association with the user information of the first user terminal, the authentication server 300 makes a call to the second user terminal 400 with the user's one-time ID information and approval authentication-related call identification information as caller information indication displayed on the second user terminal 400 (S130).

When the second user terminal 400 receives the call for authentication from the authentication server 300, the one-time ID information and approval authentication-related call identification information are displayed on the display screen of the second user terminal 400 (S140). The user can recognize that the call received from the authentication server is a call for approval authentication, before the user makes a call, by confirming the selected one-time ID information and approval authentication contents from the displayed information. It is here preferable that the displayed one-time ID information is the one-time ID information provided by the user.

In the meantime, the one-time ID information may be modified or coded by one of the first user terminal 100 and the contents service provision server 200 and then is delivered to the authentication server 300. Then, the call requester of the authentication server 300 restores the modified or coded one-time ID information. Such modification and restoration can be performed according to various schemes known in the art.

Thereafter, when the user receives the calling to the second user terminal 400 and makes a call connection with the authentication server 300, the authentication server 300 provides an ARS to prompt the user to input the approval number in the second user terminal 400 (S150).

The user transmits the approval number to the authentication server 300 by inputting the approval number using an audio signal such as a DTMF under a state where the call connection is maintained (S160) and the authentication server 300 compares the approval number received from the second user terminal 400 with the stored approval number to confirm whether both of the approval numbers match with each other (S170).

If the approval number received from the second user terminal 400 matches with the stored approval number, the contents service provision server 200 is informed of approval authentication success (S180). Otherwise, the contents service provision server 200 is informed of approval authentication failure (S180).

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A user authentication system using call identification information, comprising:
    a contents service provision server having a processor and a memory which provides a contents service through a wired/wireless communication network and provides a restricted service through approval authentication;
    a first user terminal which accesses the contents service provision server to request a service requiring the approval authentication;
    an authentication server having a processor and a memory which makes a call to the first user terminal with a corresponding stored terminal number upon receiving a request for approval authentication from the contents service provision server, with approval authentication-related call identification information as caller information indication displayed at the same time of call incoming, provides a voice guidance during call connection, receives an approval number as an audio signal, and delivers a result of the approval authentication to the contents service provision server;

a second user terminal which displays the call identification information on a display screen upon receiving a call from the authentication server, informs the authentication server of contents of the incoming call, and delivers an approval number input, corresponding to the approval number, under a call connection state, as an audio signal, to the authentication server; and a data comparator which receives the approval number from the second user terminal during the call connection state, compares the received approval number with a stored approval number to determine whether or not the received approval number input matches the stored approval number, and transmits a result of the determination to the contents service provision server, wherein the approval authentication-related call identification information is a character, an image or a combination thereof to allow a user to confirm the contents of the incoming call, wherein the received approval number comprises user-related information stored in the authentication server by the user, and wherein the one-time ID information is one-time information input or selected by a user of the first user terminal to allow the user to identify that the call made by the call requester is a call related to approval requested by the user from the caller information indication displayed when the call made by the call requester is received in the second user terminal.

2. A user authentication system using call identification information, comprising:

an authentication server having a processor and a memory, and including:

a communication interface which receives approval authentication request information from an external contents server and transmits a result of the approval authentication;

a call requester which verifies information of a first user terminal requesting approval authentication and approval authentication-related call identification information from approval authentication request information of the external contents server and makes a call to the first user terminal with a second user terminal number stored in association with the first user terminal, with the approval authentication-related call identification information as caller information indication displayed on the second user terminal at the time of call incoming; and a data comparator which receives an approval number, as an audio signal, from the second user terminal during a call connection state, compares the received approval number with a stored approval number to determine whether or not the approval authentication is made, and the received approval number input matches the stored approval number, and transmits a result of the determination to the external contents server via the communication interface, wherein the received approval number comprises user-related information stored in the authentication server by the user, and wherein the one-time ID information is one-time information input or selected by a user of the first user terminal to allow the user to identify that the call made by the call requester is a call related to approval requested by the user from the caller information indication displayed when the call made by the call requester is received in the second user terminal.

3. The user authentication system according to claim 2, wherein the authentication server further includes a memory storing a telephone number of the second user terminal and a corresponding approval number.

4. A user authentication method using call identification information, comprising:

an approval authentication requesting step in which a first user terminal requests a contents service provision server having a processor and a memory to provide a service requiring approval authentication;

a call identification information transmitting step in which the contents service provision server requested to provide the service requiring the approval authentication delivers approval authentication-related call identification information to an authentication server having a processor and a memory and requests the authentication server to provide the approval authentication;

a call outgoing step in which the authentication server requested to provide the approval authentication makes a call to the second user terminal with a corresponding terminal number stored in association with the first user terminal, with the received approval authentication-related call identification information as caller information indication displayed on the second user terminal at the time of call incoming;

an approval number input step in which the second user terminal displays the approval authentication-related call identification information, informs the authentication server of the call incoming, and transmits an approval number for user authentication input according to a guidance under an incoming call connection state, as an audio signal, to the authentication server; and an approval processing step in which the authentication server compares the approval number received from the second user terminal with a stored approval number and determines whether or not the transmitted approval number input matches the stored approval number, and delivers a result of the approval to the contents service provision server wherein the transmitted approval number comprises user-related information stored in the authentication server by the user, wherein the one time ID information is one time information input or selected by a user of the first user terminal to allow the user to identify that the call made by the call requester is a call related to approval requested by the user from the caller information indication displayed when the call made by the call requester is received in the second user terminal.

5. The user authentication method according to claim 4, wherein, in the approval number input step, the second user terminal transmits the approval number in a DTMF (Dual-Tone Multi-Frequency) signaling scheme.

6. A user authentication method using call identification information, comprising:

a call outgoing step in which an authentication server having a processor and a memory, and receives an approval authentication request including approval authentication-related call identification information from a contents service provision server having a processor and a memory for provision of a service requested from a first user terminal makes a call to a second user terminal with a corresponding terminal number stored in association with the first user terminal, with the received approval authentication-related call identification information as caller information indication displayed on the second user terminal at the time of call incoming;

an approval number input requesting step in which the authentication server requests the second user terminal to input an approval number for user authentication through a voice during call connection as the call made in the call outgoing step is received in the second user terminal; and an approval number comparing step in which the authentication server receives the approval number as an audio signal from the second user terminal during the call connection compares the received approval number with a stored approval number to determine whether or not the received approval number input matches the stored approval number, and delivers a result of the approval to the contents service provision server wherein the approval authentication-related call identification information is a character, an image or a combination thereof to allow a user to confirm that contents of the call outgoing are for approval authentication, and wherein the received approval number is information stored in the authentication server by the user; and an approval delivering step in which the authentication delivers a result of the approval to the contents service provision server wherein the transmitted approval number comprises user-related information stored in the authentication server by the user, wherein the one-time ID information is one-time information input or selected by a user of the first user terminal to allow the user to identify that the call made by the call requester is a call related to approval requested by the user from the caller information indication displayed when the call made by the call requester is received in the second user terminal.

7. The user authentication method according to claim 6, wherein the approval number input requesting is performed in an ARS (Automatic Response System) scheme.

8. A user authentication system using call identification information, comprising:

an authentication server having a processor and a memory, and including:

a call requester which makes a call for approval authentication to a user terminal having a caller indication function to request approval authentication at an external approval authentication request; and a data comparator which provides a voice guidance requesting a user responding to a call for the approval authentication to input an approval number, receives the approval number input during call connection, as audio tone information, compares the received approval number with a stored approval number to determine whether or not the received approval number input matches the stored approval number, confirms whether or not approval is made, and transmits a result of the confirmation to the external requesting the approval authentication, wherein the call requester performs the approval authentication with single calling and provides two kinds of information sequentially in a single communication scheme by further providing the approval authentication-related call identification information as caller indication information displayed on the user terminal at the same time of call incoming, and transmits a result of the determination to a contents service provision server having a processor and a memory, wherein the input approval number comprises user-related information stored in the authentication server by the user, and wherein the one-time ID information is one-time information input or selected by a user of the first user terminal to allow the user to identify that the call made by the call requester is a call related to approval requested by the user from the caller information indication displayed when the call made by the call requester is received in the second user terminal.

9. A user authentication system using call identification information, comprising:

an authentication server having a processor and a memory, and including:

a communication interface which receives approval authentication request information including user information and one-time ID information of a first user terminal and approval authentication-related call identification information from an external contents server having a processor and a memory, and communicating with the first user terminal and transmits a result of the approval authentication to the external contents server;

a call requester which makes a call to a second user terminal with a second user terminal number stored in association with the user information of the first user terminal based on approval authentication request information received through the communication interface, with the approval authentication-related call identification information and the one-time ID information as caller information indication displayed on the second user terminal at the time of call incoming; and a data comparator which receives an approval number, as an audio signal, from the second user terminal during call connection, compares the received approval number with a stored approval number to determine whether or not the received approval number input matches the stored approval number to determine whether or not the approval authentication is made, and transmits a result of the determination to the external contents server via the communication interface, wherein the received approval number comprises user-related information stored in the authentication server by the user, and wherein the one-time ID information is one-time information input or selected by a user of the first user terminal to allow the user to identify that the call made by the call requester is a call related to approval requested by the user from the caller information indication displayed when the call made by the call requester is received in the second user terminal.

10. The user authentication system according to claim 9, wherein the one-time ID information is displayed as a text or image selected from contents directly input or presented by the user in the caller information indication.

11. The user authentication system according to claim 10, wherein the one-time ID information is modified or coded by one of the first user terminal and the external contents server and then is delivered to the call requester, and the call requester restores the modified or coded one-time ID information.

\* \* \* \* \*